US011126405B1

(12) United States Patent
Pasic et al.

(10) Patent No.: US 11,126,405 B1
(45) Date of Patent: Sep. 21, 2021

(54) UTILIZING AUGMENTED REALITY AND ARTIFICIAL INTELLIGENCE TO AUTOMATICALLY GENERATE CODE FOR A ROBOT

(71) Applicant: Accenture Global Solutions Limited, Dublin (IE)

(72) Inventors: Haris Pasic, Biot (FR); Laura Wendy Hélène Sylvie Angèle Degioanni, Roquefort-les-Pins (FR)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/906,468

(22) Filed: Jun. 19, 2020

(51) Int. Cl.
*G06F 8/34* (2018.01)
*G06K 9/00* (2006.01)
(Continued)

(52) U.S. Cl.
CPC ............... *G06F 8/30* (2013.01); *B25J 13/003* (2013.01); *G06F 3/167* (2013.01); *G06F 8/70* (2013.01); *G06F 16/9027* (2019.01); *G06F 16/90344* (2019.01); *G06F 40/205* (2020.01); *G06K 9/00335* (2013.01); *G06T 19/006* (2013.01);
(Continued)

(58) Field of Classification Search
CPC ..... G06F 8/30; G06F 8/70; G06F 8/60; G06F 16/90344; G06F 16/9027; G06F 16/322; G06F 16/55; G06F 3/167; B25J 13/003; G06K 9/00335; G06K 9/6262; G06K 9/00342; G06K 9/00671; G06K 9/46; G06K 9/00993; G06T 19/006; G10L 15/18
See application file for complete search history.

(56) References Cited

U.S. PATENT DOCUMENTS 7,765,097 B1 * 7/2010 Yu .............................. G06F 8/30
704/9
8,335,754 B2 * 12/2012 Dawson ................ G06F 16/322
706/45
(Continued)

OTHER PUBLICATIONS

Jesus Savage-Carmonai et al., The VirBot: a virtual reality robot driven with multimodal commands, 1998, [Retrieved on Jun. 8, 2021]. Retrieved from the internet: <URL: https://pdf.sciencedirectassets.com/271506/1-s2.0-S0957417400X00267/1-s2.0-S0957417498000372/main.pdf?> 7 Pages (413-419) (Year: 1998).*
(Continued)

*Primary Examiner* — Anibal Rivera
(74) *Attorney, Agent, or Firm* — Harrity & Harrity, LLP

(57) ABSTRACT

A device may receive, from an augmented reality device, speech data identifying augmented reality interactions with an augmented reality robot. The device may receive, from a camera, video data identifying movements of a real robot based on the augmented reality interactions with the augmented reality robot. The device may process the speech data to obtain first action data identifying first actions that the real robot is to perform. The device may process the video data to obtain second action data identifying second actions that the real robot is to perform. The device may process the first action data and the second action data to generate pseudocode. The device may transform the pseudocode into code. The device may cause the real robot to execute the code, wherein executing the code causes the real robot to perform the first actions and the second actions.

20 Claims, 13 Drawing Sheets

(51) Int. Cl.

| | | |
|---|---|---|
| *G06F 8/30* | (2018.01) | |
| *G06F 8/70* | (2018.01) | |
| *B25J 13/00* | (2006.01) | |
| *G06F 3/16* | (2006.01) | |
| *G06F 40/205* | (2020.01) | |
| *G06F 16/903* | (2019.01) | |
| *G06F 16/901* | (2019.01) | |
| *G06T 19/00* | (2011.01) | |
| *G10L 15/18* | (2013.01) | |
| *G06K 9/62* | (2006.01) | |

(52) U.S. Cl.
CPC .......... *G10L 15/18* (2013.01); *G06K 9/00342* (2013.01); *G06K 9/00671* (2013.01); *G06K 9/00993* (2013.01); *G06K 9/6262* (2013.01)

(56) References Cited

U.S. PATENT DOCUMENTS

| | | | | |
|---|---|---|---|---|
| 10,074,381 | B1* | 9/2018 | Cowburn | G10L 21/10 |
| 10,866,631 | B2* | 12/2020 | Nguyen | G06T 11/00 |
| 10,922,049 | B2* | 2/2021 | Bolden | G06T 11/60 |
| 2012/0092157 | A1* | 4/2012 | Tran | A61B 5/0008 340/539.12 |
| 2013/0346168 | A1* | 12/2013 | Zhou | G06F 1/163 705/14.4 |
| 2015/0068069 | A1* | 3/2015 | Tran | A43B 13/183 36/136 |
| 2018/0133900 | A1* | 5/2018 | Breazeal | B25J 19/026 |
| 2018/0293050 | A1* | 10/2018 | Bolden | G06F 40/40 |
| 2018/0349108 | A1* | 12/2018 | Brebner | H04W 4/80 |
| 2019/0139315 | A1* | 5/2019 | Locke | G07C 9/257 |
| 2019/0385588 | A1* | 12/2019 | Park | G10L 13/08 |
| 2020/0042832 | A1* | 2/2020 | Kim | G06N 7/005 |
| 2020/0211290 | A1* | 7/2020 | Choi | G06K 9/00671 |
| 2020/0285788 | A1* | 9/2020 | Brebner | G06F 9/547 |
| 2020/0285855 | A1* | 9/2020 | Brebner | G06K 9/00993 |
| 2020/0285912 | A1* | 9/2020 | Brebner | G06K 9/46 |
| 2020/0285977 | A1* | 9/2020 | Brebner | H04W 4/029 |
| 2020/0348662 | A1* | 11/2020 | Cella | G05B 23/0289 |
| 2021/0049817 | A1* | 2/2021 | Lee | G06Q 30/0281 |
| 2021/0089040 | A1* | 3/2021 | Afrouzi | A47L 9/2894 |
| 2021/0114459 | A1* | 4/2021 | Lee | H04W 4/44 |
| 2021/0142059 | A1* | 5/2021 | Lee | G06K 9/6256 |
| 2021/0157312 | A1* | 5/2021 | Celia | G05B 13/028 |

OTHER PUBLICATIONS

Nadine. E. Miner et al., An Interactive virtual reality simulation system for robot control and operator, May 8-13, 1994, [Retrieved on Jun. 8, 2021], Retrieved from the internet: <URL: https://ieeexplore.IEEE.org/stamp/stamp.jsp?tp=&arnumber=351289> 8 Pages (1428-1435) (Year: 1994).*

Jesus Savage-Carmona et al., The VirBot: a virtual reality robot driven with multimodal commands, 1998, [Retrieved on Jun. 8, 2021 ]. Retrieved from the internet: <URL: https://pdf.sciencedirectassets.com/271506/1-s2.0-S0957417400X00267/1-s2.0-S0957417498000372/main.pdf?> 7 Pages (413-419) (Year: 1998).*

Christopher R. Hudson et al., Implementation of a Speech Enabled Virtual Reality Training Tool for Human-Robot Interaction, Aug. 23-28, 2018, [Retrieved on Jun. 8, 2021], Retrieved from the internet: <URL: https://ieeexplore.IEEE.org/stamp/stamp.jsp?> 6 Pages (309-314) (Year: 2018).*

Blankemeyer et al., "Intuitive Robot Programming Using Augmented Reality," ScienceDirect, Procedia CIRP 76, 2018, pp. 155-160.

* cited by examiner

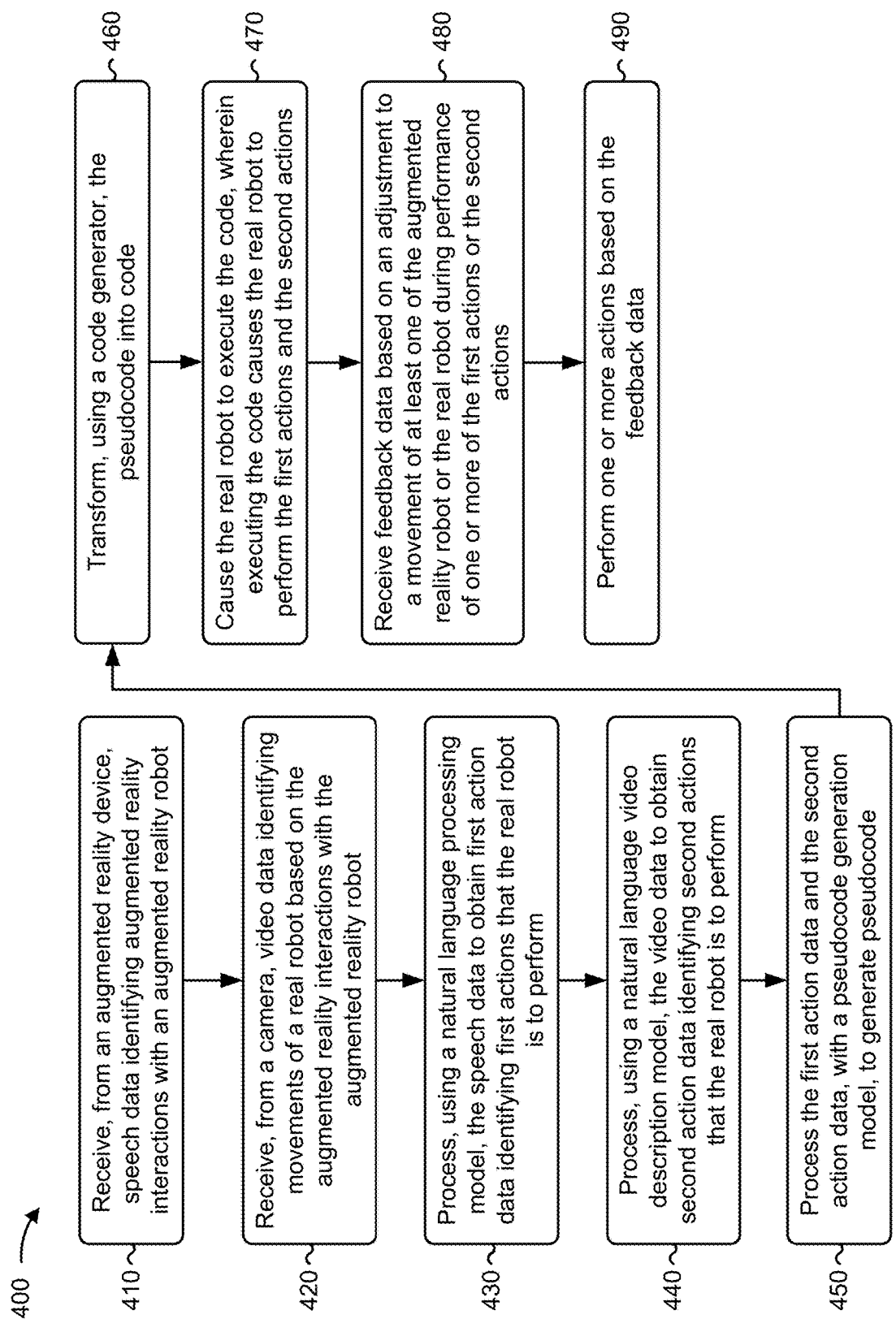

UTILIZING AUGMENTED REALITY AND ARTIFICIAL INTELLIGENCE TO AUTOMATICALLY GENERATE CODE FOR A ROBOT

BACKGROUND

Augmented reality is an interactive experience of a real-world environment where the objects that reside in the real world are enhanced by computer-generated perceptual information. The perceptual information may include visual information, auditory information, haptic information, and/or the like.

SUMMARY

According to some implementations, a method may include receiving, by a device and from an augmented reality device, speech data identifying augmented reality interactions with an augmented reality robot; receiving, by the device and from a camera, video data identifying movements of a real robot based on the augmented reality interactions with the augmented reality robot; processing, by the device and using a natural language processing model, the speech data to obtain first action data identifying first actions that the real robot is to perform; processing, by the device and using a natural language video description model, the video data to obtain second action data identifying second actions that the real robot is to perform; processing, by the device, the first action data and the second action data, with a pseudocode generation model, to generate pseudocode; transforming, by the device and using a code generator, the pseudocode into code; causing, by the device, the real robot to execute the code, wherein executing the code causes the real robot to perform the first actions and the second actions; receiving, by the device, feedback data based on an adjustment to a movement of at least one of the augmented reality robot or the real robot during performance of one or more of the first actions or the second actions; and performing, by the device, one or more actions based on the feedback data.

According to some implementations, a device may include one or more memories and one or more processors. The one or more processors may be configured to: receive, from an augmented reality device, speech data identifying augmented reality interactions with an augmented reality robot; receive, from a camera, video data identifying movements of a real robot based on the augmented reality interactions with the augmented reality robot; process, with a natural language processing model, the speech data to obtain first action data identifying first actions that the real robot is to perform; process, using a natural language video description model, the video data to obtain second action data identifying second actions that the real robot is to perform; process the first action data and the second action data, with a pseudocode generation model, to generate pseudocode; match words of the pseudocode with actions, from a library that includes abstract generic predefined code for the real robot, to generate a set of matching words and actions; match the words of the pseudocode with instructions executed by the real robot to generate a set of matching words and instructions; generate code based on the set of matching words and actions and the set of matching words and instructions; cause the real robot to execute the code and perform the first actions and the second actions; receive, from the camera, feedback video data identifying additional movements of the real robot based on execution of the code; and perform one or more actions based on the feedback video data.

According to some implementations, a non-transitory computer-readable medium may store one or more instructions. The one or more instructions, when executed by one or more processors of a device, may cause the one or more processors to: receive, from an augmented reality device, speech data identifying augmented reality interactions with an augmented reality robot; receive, from a camera, video data identifying movements of a real robot based on the augmented reality interactions with the augmented reality robot; process, with a natural language processing model, the speech data to obtain first action data identifying first actions that the real robot is to perform; process, using a natural language video description model, the video data to obtain second action data identifying second actions that the real robot is to perform; process the first action data and the second action data, with a pseudocode generation model, to generate pseudocode; transform the pseudocode into code; cause the real robot to execute the code and perform the first actions and the second actions; receive, from the camera, feedback video data identifying additional movements of the real robot based on execution of the code; and retrain the natural language processing model or the natural language video description model based on the feedback video data.

BRIEF DESCRIPTION OF THE DRAWINGS

FIG. 4 is a flow chart of example processes relating to utilizing augmented reality and artificial intelligence to automatically generate code for a robot.

DETAILED DESCRIPTION

Figure 1A:
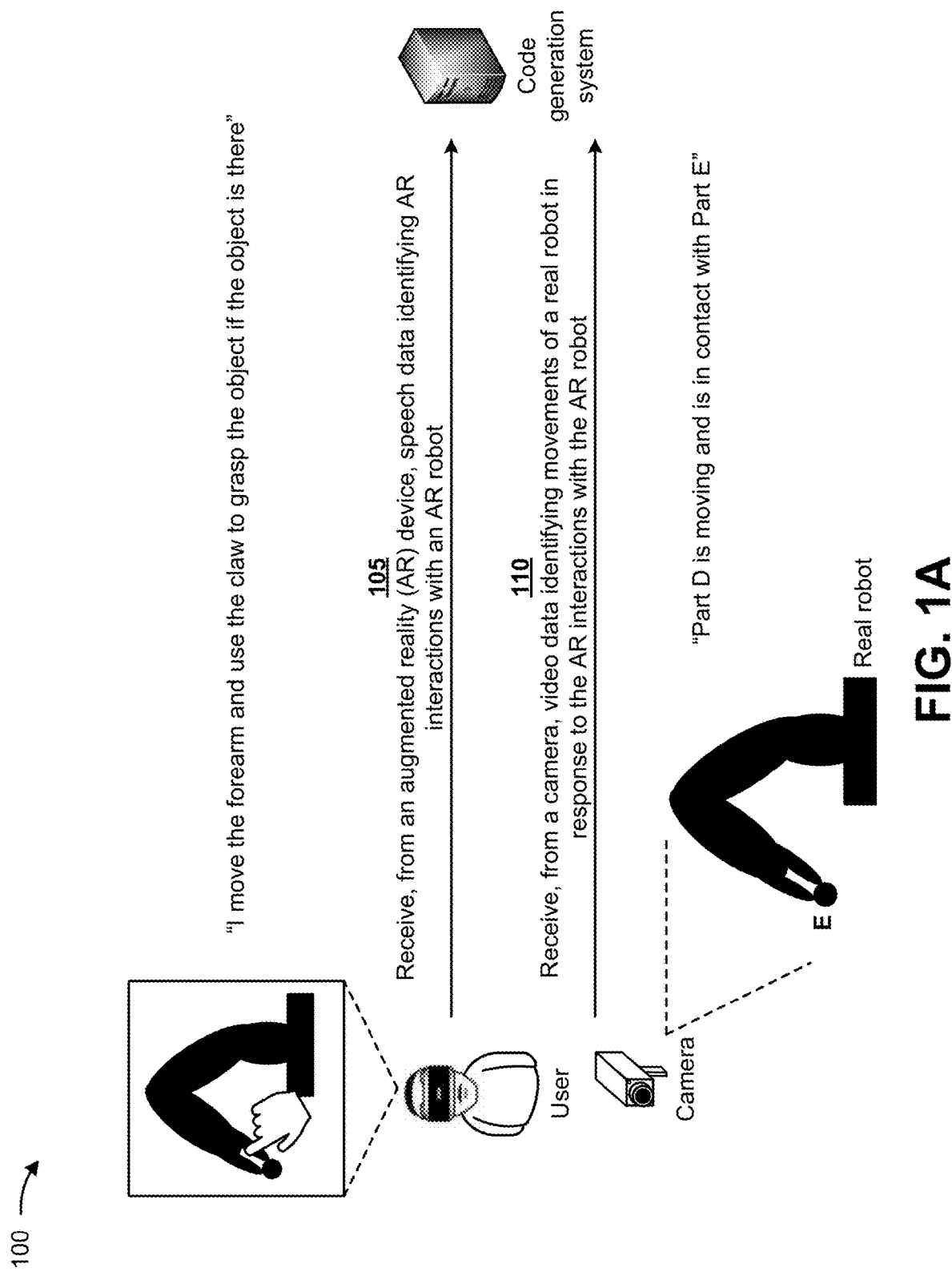
FIGS. 1A-1J are diagrams of an example implementation described herein.

The following detailed description of example implementations refers to the accompanying drawings. The same reference numbers in different drawings may identify the same or similar elements.

To program a robot to perform a task, a user may need to have specific and highly technical skills, such as those of a software engineer, a computer engineer, and/or the like. Depending upon the complexity of the task, the user may spend tens, hundreds, and/or thousands of hours writing the code required to program the robot. Additionally, after the code is written, the user must test the code, modify the code to correct any errors identified based on the testing, and/or the like. Thus, the process for programming the robot to perform the task may be a long and tedious process that consumes a large amount of resources (e.g., time resources, human resources, computing resources (e.g., processing resources, memory resources, communication resources, and/or the like), and/or the like).

Some implementations described herein may be directed to a code generation system that uses augmented reality (AR) and automated intelligence (AI) to program a robot to perform a task. The code generation system may include an AR device that displays a virtual robot via a display of the AR device. The user may use the AR device to manipulate the virtual robot to perform an action. As the user manipulates the virtual robot, the user may provide a verbal explanation as to how the robot is being manipulated, the action the robot is performing based on the manipulation, a circumstance or reason associated with the robot performing the action, and/or the like. The verbal explanation may be captured by a microphone of the AR device and may be provided to the code generation system as speech data.

The AR system may provide data associated with the action performed by the virtual robot to a real robot. The real robot may receive the data and may perform the action based on the data. A camera of the code generation system may capture video data of the real robot performing the action and may provide the video data to the code generation system.

The code generation system may utilize machine learning to create a function based on the speech data and the video data. The function may be executable code that can be used to program the real robot to perform the action. The code generation system may store the function as an independent module or component in a data structure (e.g., a database). A user desiring to program a robot to perform the action, may obtain (e.g., download) the function from the code generation system from the data structure and use the function to program the robot.

In this way, the code generation system may quickly and efficiently generate pluggable, reusable, and shareable code that can be used by a user to program a robot. By quickly and efficiently generating pluggable, reusable, and shareable code that can be used by a user to program a robot, fewer resources (e.g., time resources, human resources, computing resources (e.g., processing resources, memory resources, communication resources, and/or the like), and/or the like may be utilized to program a robot to perform a task relative to other methods and/or systems utilized to program a robot.

FIGS. 1A-1J are diagrams of one or more example implementations 100 described herein. As shown in FIGS. 1A-1J, a code generation system may be associated with a camera device, a real robot, and an augmented reality (AR) device. The camera device may include one or more devices capable of capturing an image and/or video and providing the captured image and/or video to the code generation system. For example, the camera device may include an image and/or video capturing device, a 360-degree camera, an infrared camera, and/or the like.

The real robot may include one or more devices capable of being programmed to perform an action automatically based on sensory input (e.g., an image, a sound, and/or the like). For example, the real robot may include a robotic arm, an unmanned aerial vehicle, an autonomous vehicle, and/or the like.

The AR device may be a device that provides a view of a real environment and enhances the view by providing computer generated perceptual information (e.g., images, sounds, and/or the like). The AR device may include a processor, a display, a camera, a microphone, and/or the like. The AR device may use the camera to capture an image (e.g., an image, video data, and/or the like) of the physical or real world corresponding to a field of view of the user. The AR device may generate a virtual robot (referred to herein as an AR robot) to include in the image. The captured image and the AR object may be provided to the user via the display.

As shown in FIG. 1A, and by reference number 105, the code generation system receives, from an AR device, speech data identifying AR interactions with an AR robot. The user may use the AR device to manipulate the AR robot to perform an action (e.g., an AR interaction). As the user performs the AR interaction, the user may provide a description associated with the AR interaction. The description may include information indicating how the user is manipulating the AR robot, information indicating why the user is manipulating the virtual robot, and/or information indicating a condition associated with the AR interaction (e.g., a reason why the user is manipulating the AR robot to perform the action).

As shown in FIG. 1A, the user moves the forearm of the AR robot (component A, as shown in FIG. 1A) and manipulates the claw of the AR robot (component D, as shown in FIG. 1A) to grasp an object and provides a verbal description of "I move the forearm and use the claw to grasp the object if the object is there." The AR device may convert the description into speech data identifying the AR interaction with the AR robot and may provide the speech data to the code generation system.

In some implementations, the description is a verbal description that is spoken out loud by the user as the user performs the AR interaction. The verbal description may be captured by a microphone associated with the AR device. The AR device may convert the verbal description into speech data corresponding to a digital representation of the verbal description. The AR device may provide the speech data to the code generation system.

In some implementations, the description is a textual description. The textual description may be a description written on a piece of paper, a description written on a virtual piece of paper displayed to the user via the display of the AR device, a description input into a word processing application via a user device (e.g., a computer, a tablet, a smart phone, and/or the like), and/or the like. The AR device may capture the textual description and convert the textual description into the speech data. As an example, assume the description is a textual description written on a piece of paper. The camera of the AR device may capture an image of the piece of paper including the textual description. The AR device may perform optical character recognition (OCR) to convert the image of the piece of paper into the speech data.

As shown by reference number 110, the code generation system receives from a camera, video data identifying movements of a real robot based on the AR interactions with the AR robot. The AR device may provide data associated with the AR interaction to the real robot. The data may include information identifying an action performed by the AR robot based on the AR interaction. For example, the data may include information indicating a component of the AR robot manipulated by the user, information indicating a movement of the component made based on being manipulated by the user, and/or the like.

The real robot may receive the data and may perform an action corresponding to the action performed by the real robot based on the AR interaction. As shown in FIG. 1A, the real robot moves component D to grasp and pick up the ball. The camera device associated with the code generation system may capture video data of the real robot performing the action and may provide the video data to the code generation system. In some implementations, the video data is received substantially concurrently with receipt of the speech data.

Figure 1B:
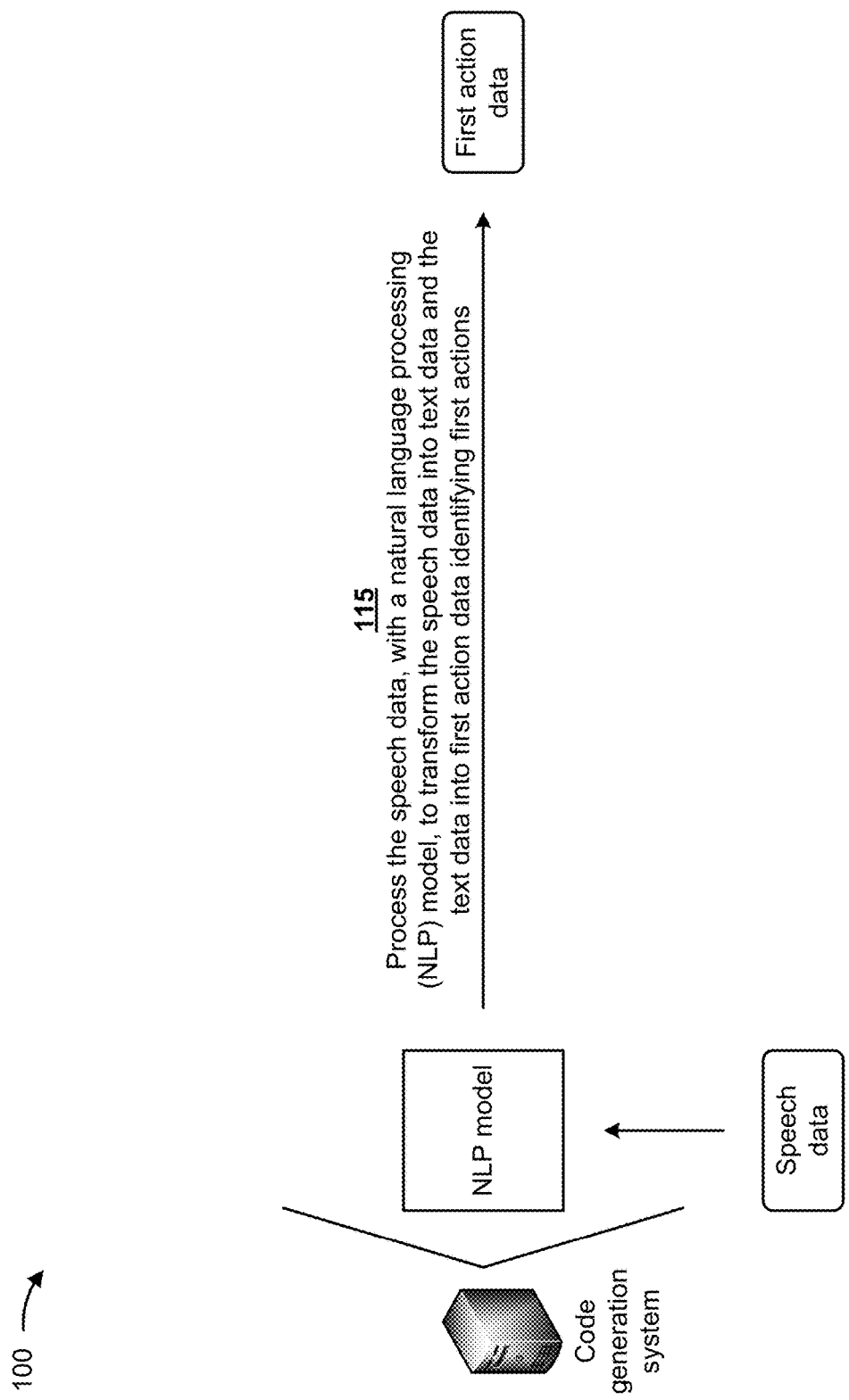

As shown in FIG. 1B, and by reference number 115, the code generation system processes the speech data, with a natural language processing (NLP) model, to transform the speech data into text data and the text data into first action data identifying first actions. In some implementations, the code generation system may train the NLP model based on one or more parameters associated with NLP, such as a grammar rule, a grammatical structure, a definition, a synonym, a functional word (e.g., a word associated with performing a function, such as move, place, and/or the like), and/or the like. The code generation system may train the NLP model using historical data associated with speech data corresponding to descriptions of AR interactions according to the one or more parameters. Using the historical data and the one or more parameters as inputs to the NLP model, the code generation system may process speech data to transform the speech data into text data and the text data into first action data identifying actions.

In some implementations, the code generation system processes the speech data based on identifying portions of the speech data associated with components of the AR robot (e.g., component A, component B, arm, hand, and/or the like), portions of the speech data associated with an object associated with the AR interaction (e.g., a ball picked up by the AR robot), portions of the speech data associated with actions (e.g., move, bend, rotate, and/or the like), and/or portions of the speech data associated with a condition associated with the AR interaction (e.g., if, when, and/or the like). The above-listed portions of the speech data are intended to be merely examples of types of portions of speech data that may be identified. In practice, the portions of speech data may include any one or more of the above-listed portions of speech data and/or one or more other types of portions of speech data not listed above.

The code generation system may generate the first action data based on associating a component of the AR robot with an action and/or an object. As an example, the code generation system may process the speech data associated with the description "I use the claw to grasp the object if it is there" to generate first action data of "claw grasp object if there".

Figure 1C:
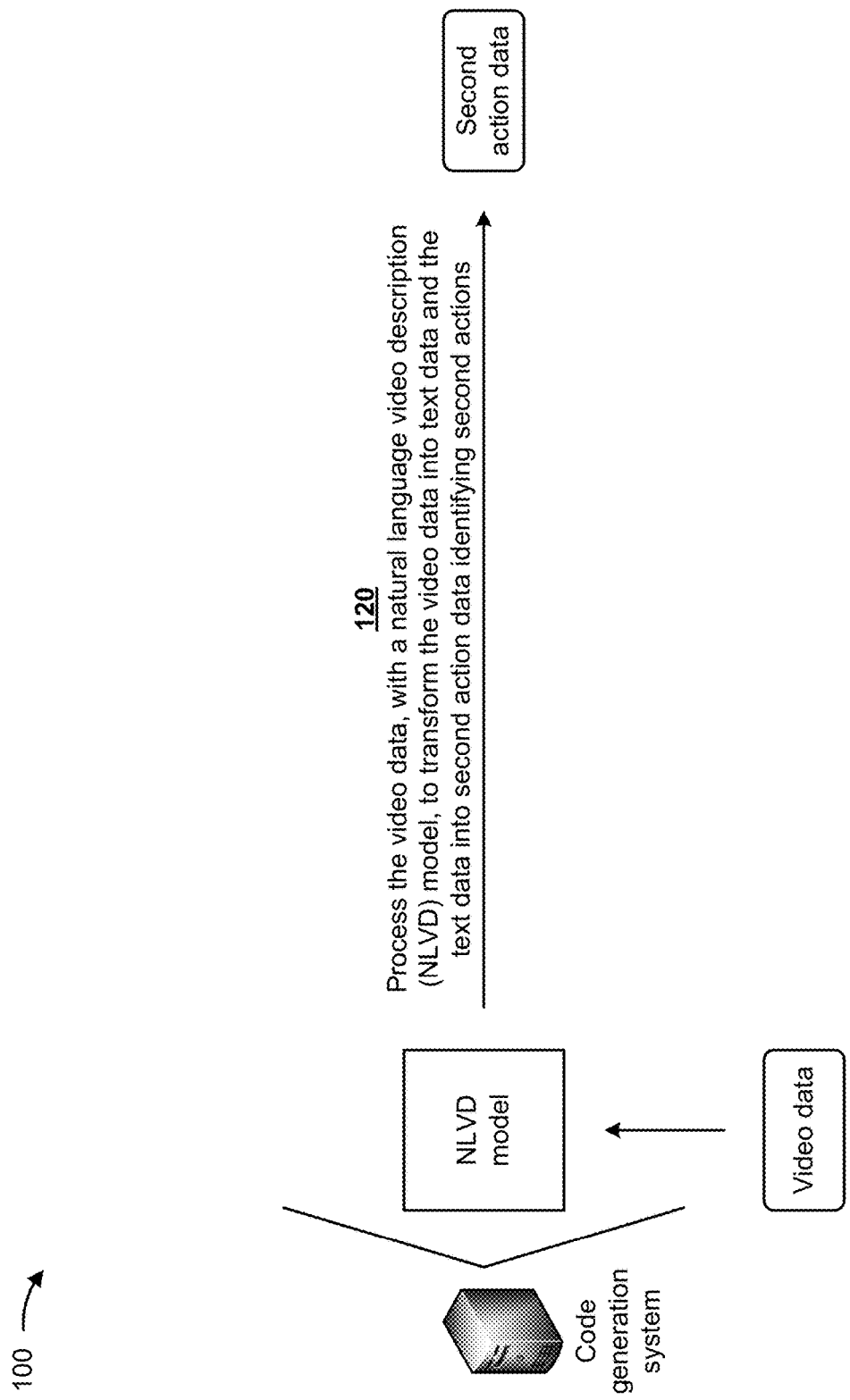

As shown in FIG. 1C, and by reference number 120, the code generation system processes the video data, with a natural language video description (NLVD) model, to transform the video data into text data and the text data into second action data identifying second actions. In some implementations, the code generation system may train the NLVD model based on one or more parameters associated with NLVD. The code generation system may train the NLVD model using historical data associated with video data of actions performed by a robot according to the one or more parameters. Using the historical data and the one or more parameters as inputs to the NLVD model, the code generation system may process video data to transform the video data into text data and the text data into second action data identifying actions.

The text data may include a natural language sentence that describes the content of the video data (e.g., describes the action performed by the real robot). The code generation system may generate the text data based on identifying objects in the video data (e.g., the real robot, a component of the real robot, and/or the like) and based on identifying actions performed by the objects (e.g., component D moves downward, component D grasps an object, and/or the like).

In some implementations, the real robot includes markers identifying components of the real robot. For example, a component of the real robot may include a QR code, a bar code, and/or the like. The code generation system may analyze the video data and may identify the marker. The code generation system may identify the component based on the marker. For example, the code generation system may access a data structure (e.g., a data base, a table, a list, and/or the like) storing information associating the marker to a component of the real robot. The code generation system may identify the component based on the information stored in the data structure.

In some implementations, the code generation system identifies an action performed by the real robot based on a location of the marker within a series of frames of the image data. The code generation system may determine an initial location of a component in a first frame of the video data. The code generation system may determine a location of the component for a series of subsequent frames of the video data. The code generation system may determine that the component moves from the initial location to a final location and/or a path of the movement based on the location of the component determined for the series of subsequent frames of the video data.

The code generation system may generate text data corresponding to the identified action performed by the real robot. The code generation system may include a data structure associating text data with components of the real robot and/or actions (e.g., move, rotate, lift, and/or the like). The code generation system may identify the text data associated with components and/or actions identified based on the video data and may transform the text data into the second action data. In some implementations, the code generation system generates the second action data based on the text data in a manner similar to that described above.

Figure 1D:
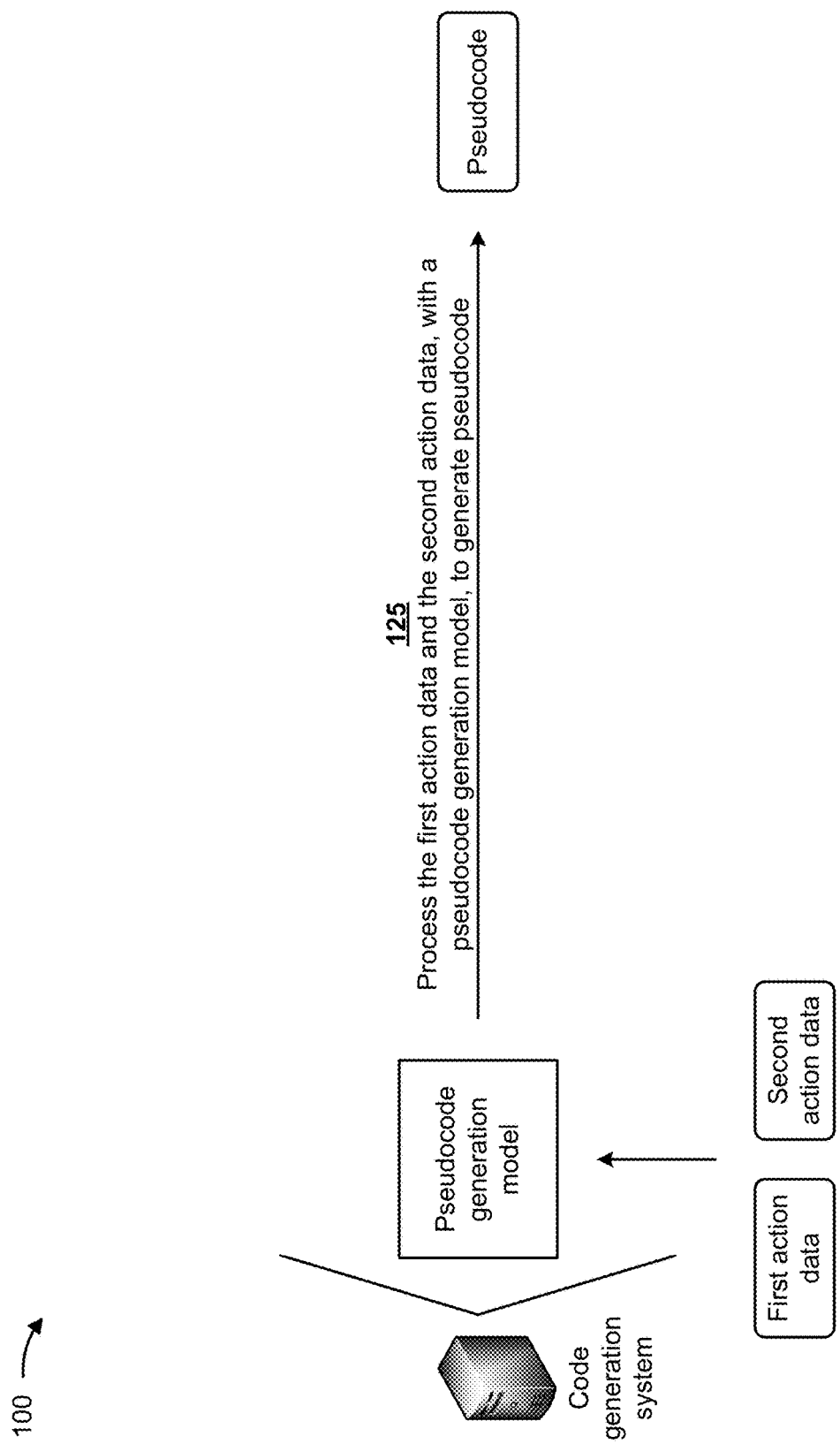

As shown in FIG. 1D, and by reference number 125, the code generation system processes the first action data and the second action data, with a pseudocode generation model, to generate pseudocode. The code generation system may generate the pseudocode as described below with respect to FIGS. 1E-1F. In some implementations, the code generation system trains the pseudocode generation model in a manner similar to that described above.

Figure 1E:
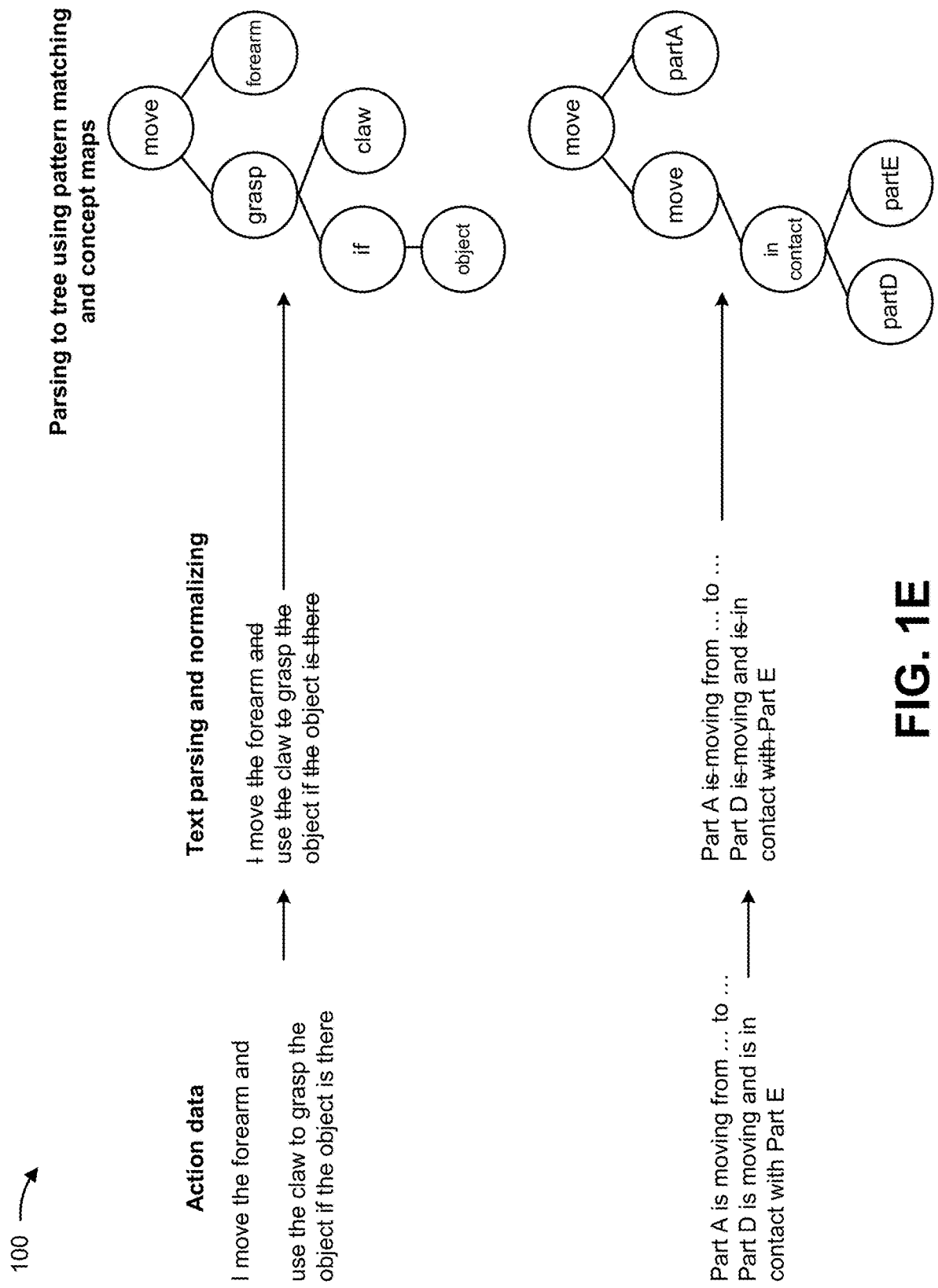

As shown in FIG. 1E, the code generation system may parse and/or normalize the first and second action data and may use pattern matching and concept maps to generate trees based on the parsed and/or normalized action data. The code generation system may parse the first action data based on a grammar of the natural language. The code generation system may determine a grammatical structure of the first action data and may group words in the first action data into units or phrases. As shown in FIG. 1E, the code generation system groups the words in the first action data into two units or phrases: "I move the forearm and" and "use claw to grasp the object if the object is there".

In some implementations, the code generation system normalizes the units or phrases by removing extraneous words (e.g., "the", "an", and/or the like). The code generation system may access a data structure storing information identifying extraneous words. The code generation system may identify extraneous words in the first action data based on the information stored in the data structure. The code generation system may remove the extraneous words to generate parsed and normalized first action data. As shown in FIG. 1E, the code generation system removes the extraneous words "I", "the", and "and" from the first phrase and the extraneous words "the", "to", "is", and "there" from the second phrase.

The code generation system may generate a first tree structure based on pattern matching and concept mapping the parsed and normalized first action data. The first tree structure may be a data structure that represents the relationship between different words included in the parsed and normalized first action data. The first tree structure may include a plurality of nodes connected by a plurality of edges. A node may correspond to a word included in the parsed and normalized first action data. An edge may represent a relationship between two nodes.

The code generation system may identify a concept associated with a word included in the parsed and normalized first action data based on a concept map. The concept map may be a semantic model representing semantic relationships between concepts. A relationship may be a first type of relationship or a second type of relationship. The first type of relationship is an inheritance hierarchy in which a child concept is a type of a parent concept (e.g., a terrier is a type of dog). The second type of relationship is a containment relationship. The containment relationship indicates that a parent concept requires a child concept as a parameter (e.g., a number is a required parameter for a mathematical operator, such as add, subtract, and/or the like).

A concept may refer to an object that has a name and at least one property. The name may correspond to the name of the object or a class to which the object belongs. For example, a concept may refer to an object such as the mathematical operator add and may have the name mathematical operator. The property may refer to a type of the object or how the object relates to other concepts (e.g., a one-to-one relationship, a one-to-many relationship, and/or the like). The concept add may have the first type of relationship with the concept mathematical operator based on a sum being a type of a mathematical operator. The concept add may have the second type of relationship with the concepts "1" and "2" based on the concept sum requiring the concepts 1 and 2 as parameters for performing the mathematical operation.

In some implementations, the concept is associated with a manifest. The manifest may include a list of words and/or regular expressions that are potential matches (e.g., synonyms) for the concept. For example, the concept add may be associated with a manifest that includes words such as sum, combine, and/or the like. The code generation system may identify a concept associated with a word in the parsed and normalized first action data based on comparing the word the words and/or regular expressions in the manifest.

As shown in FIG. 1E, the parsed and normalized first action data includes two phrases "move forearm" and "use claw grasp if object". The code generation system may generate a node for each word included in the two phrases. The code generation system may determine relationships between the nodes based on a concept may. The code generation system may generate edges linking the nodes based on a relationship between the words associated with the nodes. For example, as shown in FIG. 1E, the code generation system generates a node for the word "move" and a node for the word "forearm". The code generation system may determine that the nodes are related based on determining that the word forearm is a concept that has the second type of relationship with the concept move (e.g., the forearm is the object that is moved and, therefore, a required parameter of the concept move). The code generation system may generate an edge connecting the node associated with the word move and the node associated with the word forearm based on the concepts being related.

The code generation system may determine that the word grasp is a concept that has the first type of relationship with the concept move based on the word grasp being a type of movement. The code generation system may generate an edge connecting the node associated with the word move and the node associated with the word grasp based on the concepts being related. The code generation system may determine relationships between the remaining nodes and generate edges connecting one or more of the remaining nodes in a similar manner.

The code generation system may parse and normalize the second action data and may generate a second tree based on pattern matching and concept mapping the parsed and normalized second action data, in a manner similar to that described above with respect to the first action data.

Figure 1F:
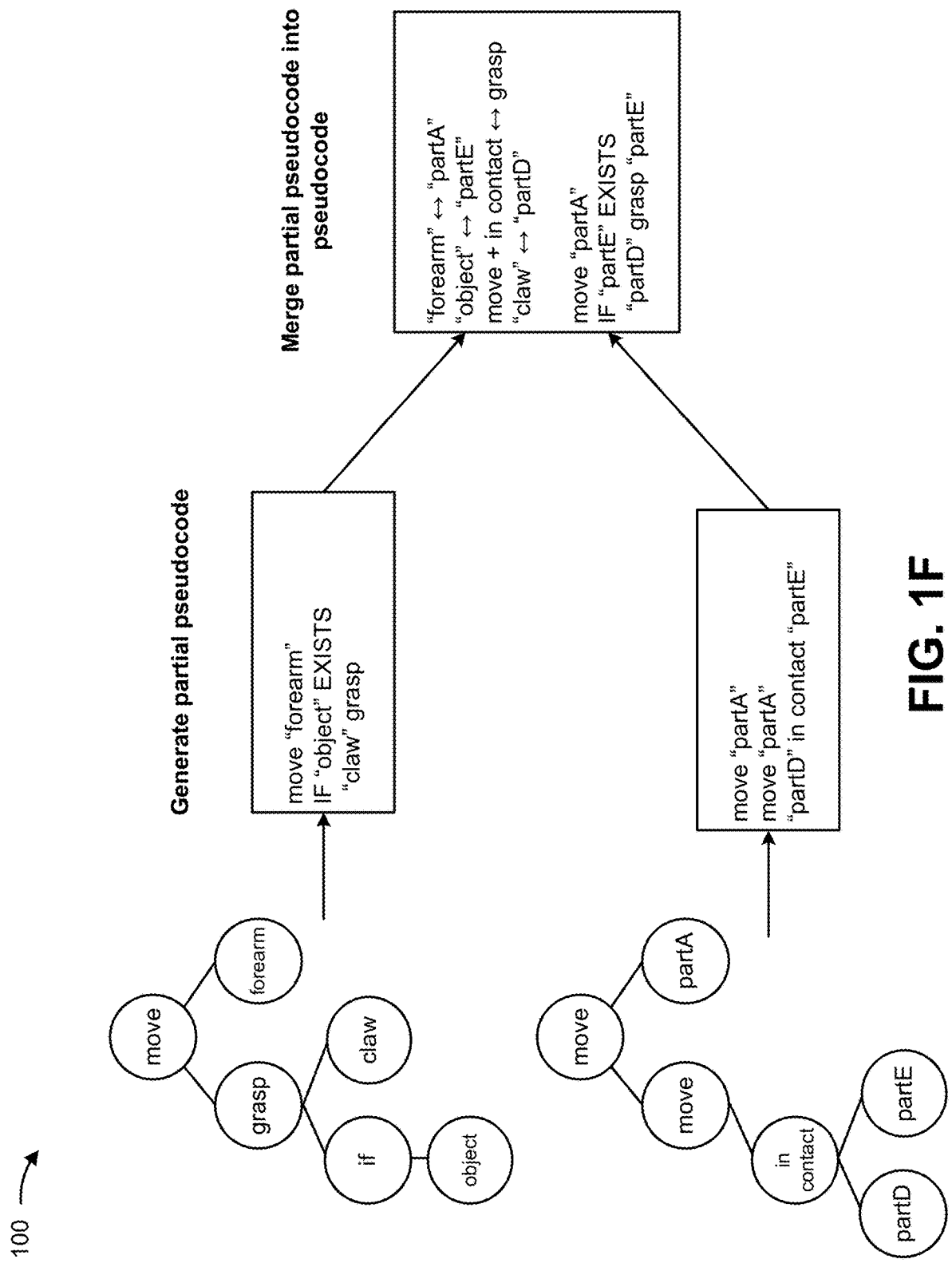

As shown in FIG. 1F, the code generation system may generate partial pseudocode based on the trees and may merge the partial pseudocodes to generate pseudocode. In some implementations, the code generation system generates the partial pseudocode based on traversing the first tree and the second tree.

The code generation system may traverse the first tree to determine a first portion of the pseudocode. The code generation system may identify a root node and may traverse each branch of the tree to generate the first portion of the pseudocode. As shown in FIG. 1F, the code generation system identifies the root node "move" and traverse a first branch of the first tree that terminates at the node "forearm". The code generation system may traverse each branch of the first tree and may generate the first portion of the pseudocode based on traversing the branches of the first tree. As shown in FIG. 1F, the code generation system generates the pseudocode move "forearm" IF "object" EXISTS "claw" grasp.

The code generation system may traverse the second tree to determine a second portion of the pseudocode. In some implementations, the code generation system may traverse the second tree to determine the second portion of the pseudocode in a manner similar to that described above with respect to the first tree.

In some implementations, the code generation system merges the first portion of the pseudocode and the second portion of the pseudocode to generate the pseudocode. The code generation system may identify corresponding portions of the first portion of the pseudocode and the second pseudocode. In some implementations, the code generation system identifies the corresponding portions based on a first line of the first portion of the pseudocode being the same as a second line of the second portion of the pseudocode. The code generation system may combine the first portion of the pseudocode and the second portion of the pseudocode and may remove the first line or the second line from the combined pseudocode.

In some implementations, the code generation system identifies the corresponding portions based on the first tree and the second tree. The code generation system may identify a node that is common to the first tree and the second tree (e.g., the node "move"). The code generation system may determine that the node "forearm" is an end node (e.g., a node that is connected to only one node) connected to the node "move" in the first tree based on the second type of relationship. The code generation system may determine that the node "partA" is an end node connected to the node "move" in the second tree based on the second type of relationship. The code generation system may determine that the node "forearm" and the node "partA" are corresponding nodes based on both nodes being connected to a node "move", both nodes being end nodes, and/or based on both nodes being connected to a node "move" based on the second type of relationship.

The code generation system may identify a portion of the first portion of the pseudocode corresponding and a portion of the second portion of the pseudocode associated with the corresponding nodes and may generate a single portion of pseudocode based on the identified portions. As an example, the code generation system may determine the portion "move 'forearm'" in the first portion of the pseudocode is associated with the node "forearm". The code generation system may determine that the portion "move 'partA'" in the second portion of the pseudocode is associated with the node "partA". The code generation system may generate a single portion of the pseudocode based on the identified portions (e.g., "move 'partA'", as shown in FIG. 1F).

Figure 1G:
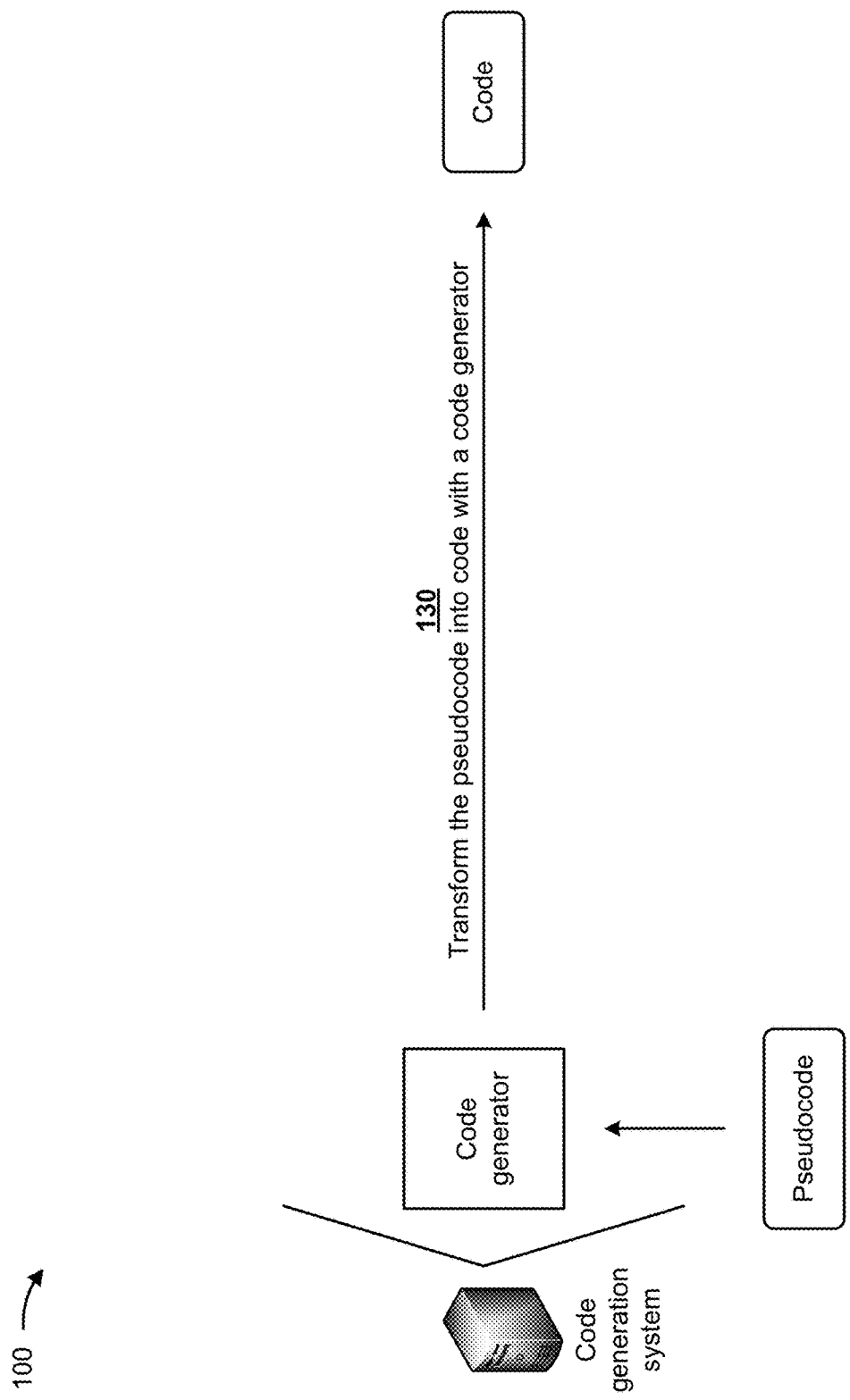

As shown in FIG. 1G, and by reference number 130, the code generation system may transform the pseudocode into code with a code generator associated with the code generation system. The code generation system may input the pseudocode in to the code generator. The code generator may match words in the pseudocode with actions stored in a library. The library may include abstract, generic, predefined code for the real robot. The code generator may generate a set of matching words and actions based on matching the words in the pseudocode with the actions stored in the library.

In some implementations, the code generator matches the words of the pseudocode with the actions from the library while the code generation system is traversing the first tree and/or while the code generation system is traversing the second tree. For example, the code generation system may traverse a first branch of the first tree and may generate a line of the first portion of the pseudocode based on traversing the first branch of the first tree. The code generation system may provide the line of the first portion of the pseudocode to the code generator. The code generator may match the words included in the line of the first portion of the pseudocode with the actions from the library while the code generation system is traversing another branch of the first tree. Alternatively, and/or additionally, the code generator matches the words of the first portion of the pseudocode and/or words of the second portion of the pseudocode with the actions from the library while the code generation system is merging the first portion of the pseudocode and the second portion of the pseudocode.

Figure 1H:
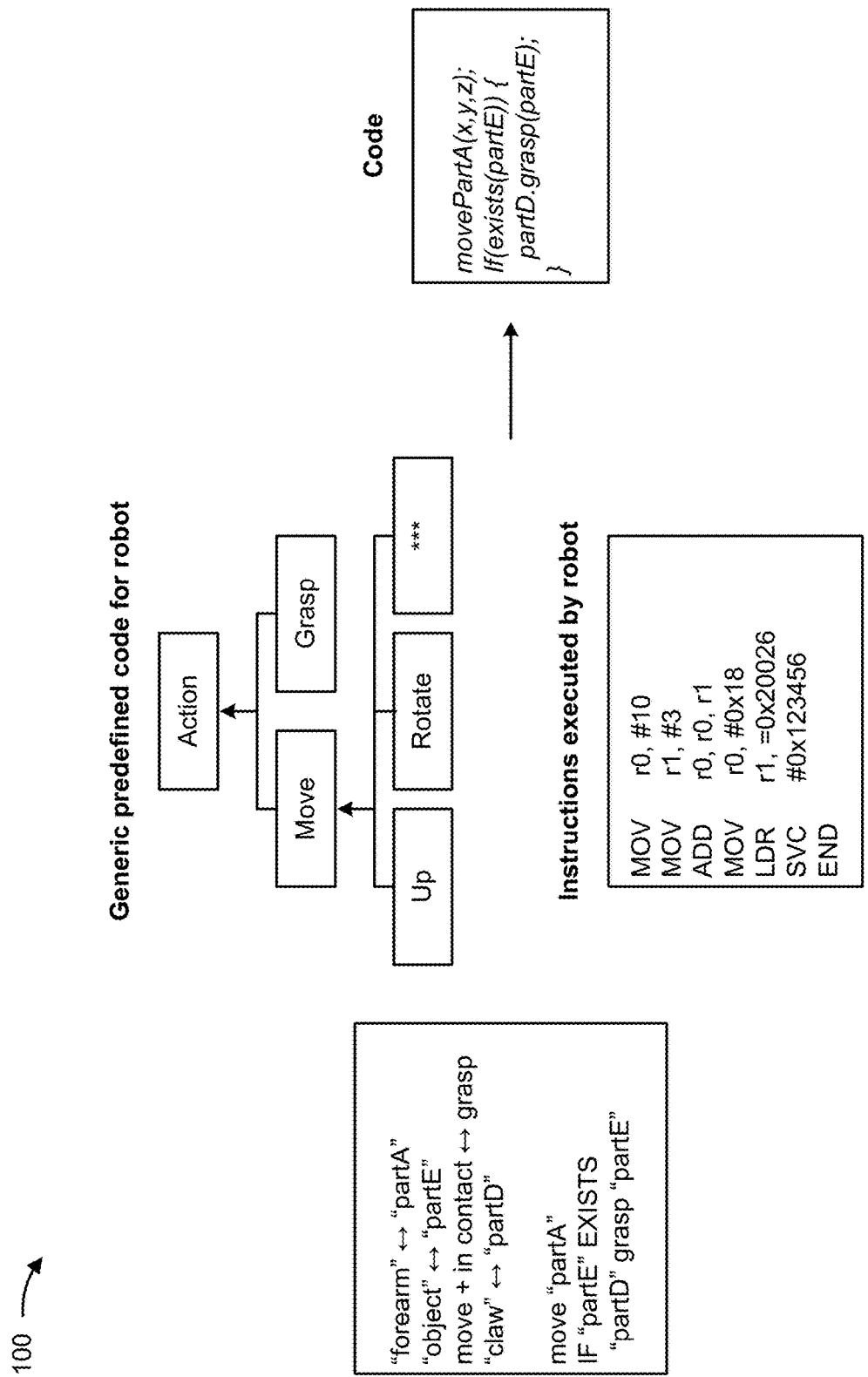

As shown in FIG. 1H, the code is generated based on determining a set of instructions executed by the real robot associated with the set of matching words and actions. The code generation system may obtain a set of instructions executed by the real robot. The code generation system may match words from the pseudocode with instructions from the set of instructions to generate a set of matching words and instructions. The code generation system may generate the code based on the set of matching words and actions and the set of matching words and instructions.

Figure 1I:
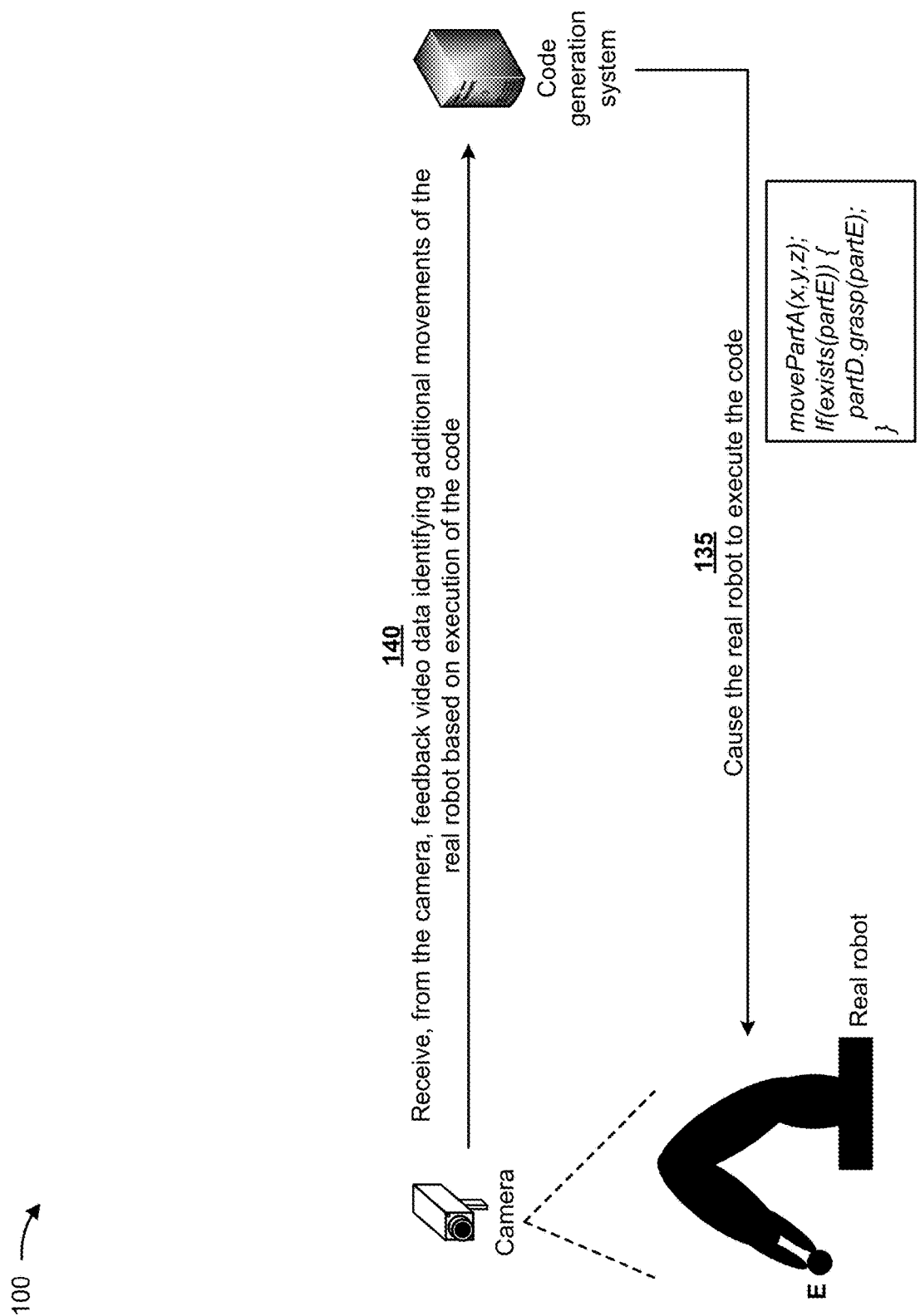

As shown in FIG. 1I, and by reference number 135, the code generation system causes the real robot to execute the code. The code generation system may provide the code to the real robot. For example, the code generation system may be connected to the real robot via a wireless network (e.g., a WiFi network, a cellular network, and/or the like) and the code generation system may provide the code to the real robot via the wireless network.

The real robot may receive the code and may execute the code to perform an action. The camera may capture video data of the real robot executing the code (e.g., feedback video data) and may provide the feedback video data to the code generation system. The code generation system may receive the feedback video data and may analyze the feedback video data to determine if the real robot performed the action correctly.

In some implementations, the code generation system analyzes the feedback video data based on comparing the feedback video data and the video data. The code generation system may determine whether a movement of the real robot in the feedback video data is the same as a movement of the real robot in the video data.

In some implementations, the movement of the real robot in the feedback video data is the same as the movement of the real robot in the video data. The code generation system may determine that the code cause the real robot to execute the action correctly based on the feedback video data being the same as the movement of the real robot in the video data. The code generation system may provide (e.g., to the user) a notification indicating that the code caused the real robot to perform the action correctly.

In some implementations, the feedback video data is not the same as the movement of the real robot in the video data. For example, as shown by reference number 140, the code generation system receives, from the camera device, feedback video data identifying additional movements of the real robot based on the execution of the code. The code generation system may determine that the feedback video data identifies the additional movements of the real robot based on comparing the feedback video data and the video data in a manner similar to that described above.

Figure 1J:
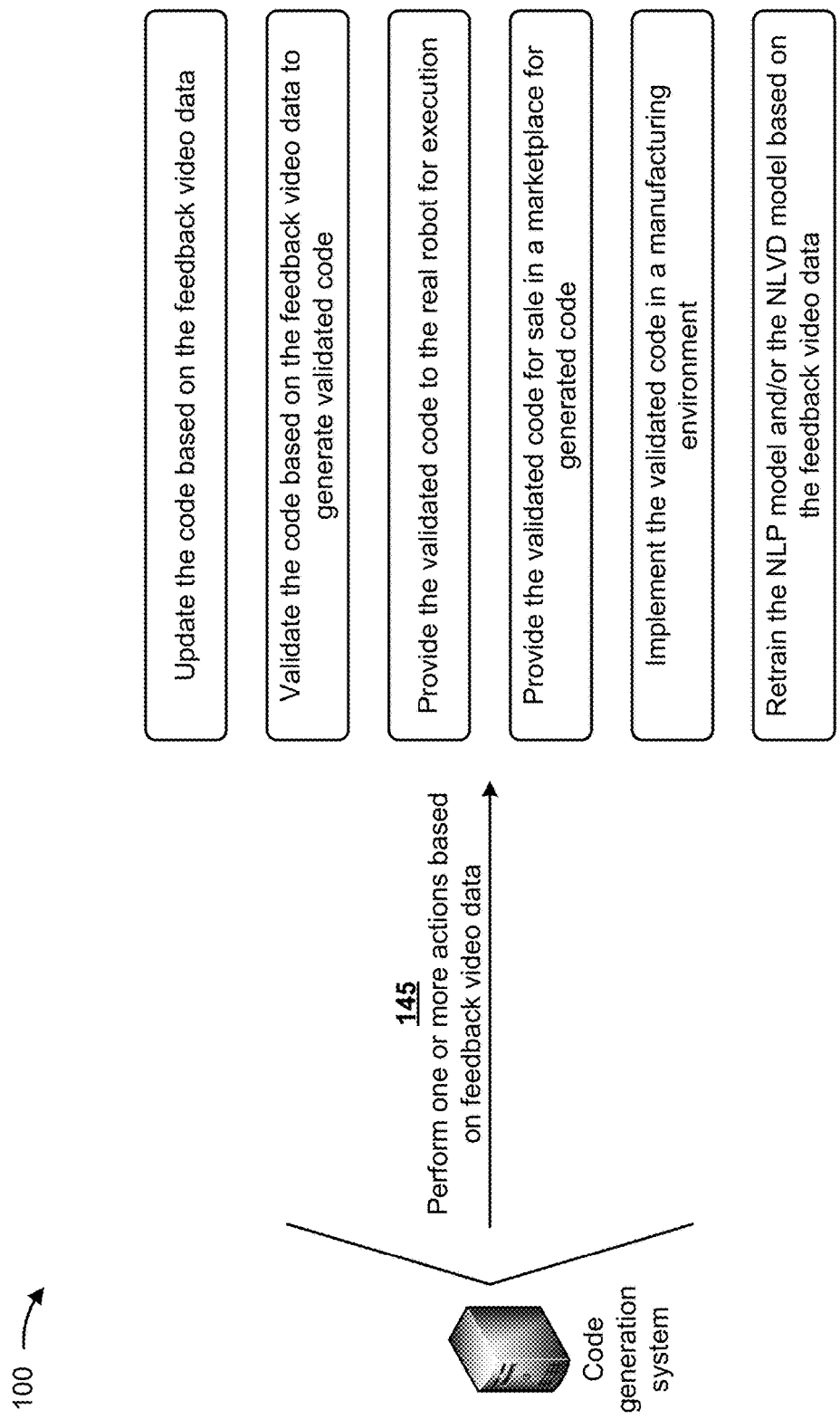

As shown in FIG. 1J, and by reference number 145, the code generation system performs one or more actions based on the feedback video data. In some implementations, the one or more actions include updating the code based on the feedback video data. The code generation system may modify the NLVD model based on the feedback video data. The code generation system may utilize the NLVD model to re-process the video data and may generate modified code for the real robot based on re-processing the video data. In this way, the code generation system may quickly and efficiently modify the code for the real robot.

In some implementations, the one or more actions include validating the code based on the feedback video data to generate validated code. The code generation system may analyze the feedback video data and may determine that the real robot performed the actions correctly based on executing the code. The code generation system may provide a notification indicating that the real robot performed the actions correctly and/or that the code has been validated. In this way, the code generation system may enable a user to easily determine that the code is validated by the code generation system.

In some implementations, the one or more actions include providing the validated code to the real robot for execution. The code generation system may provide the validated code to the real robot for execution based on that the real robot performed the actions correctly and/or that the code has been validated. In this way, the real robot may be quickly and efficiently programmed to execute validated code thereby conserving resources that may otherwise be utilized to determine if the code caused the robot to perform the action correctly and/or to utilize validated code to program the robot.

In some implementations, the one or more actions include providing the validated code for sale in a marketplace for generated code. The marketplace may allow users to buy, sell, and/or trade validated code for programming a robot. A user desiring to program a robot to perform a particular action may purchase code for performing the particular action from the marketplace. The code generation system may provide the validated code for sale in the marketplace based on validating the code. In this way, the code generation system may enable an environment that allows users to collaborate and/or exchange ideas relating to programming robots thereby enabling the advance of the robotics industry.

In some implementations, the one or more actions include implementing the validated code in a manufacturing environment. The code generation system may provide the validated code to an entity (e.g., a business, a person, and/or the like) associated with manufacturing a product. The entity may utilize the code to program one or more robots to perform a function associated with the manufacture of the product.

In some implementations, the one or more actions include retraining the NLP model and/or the NLVD model based on the feedback video data. The code generation system may modify the historical data used to train the NLP model and/or the NLVD model to include the feedback video data thereby increasing a quantity of historical data available to train the NLP model and/or the NLVD model. By increasing the quantity of historical data, an increased quantity of iterations may be performed to train the NLP model and/or the NLVD model. The increased quantity of iterations may increase an accuracy associated with the NLP model and/or the NLVD model thereby enabling the code generation system to more accurately generate the code for the real robot.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
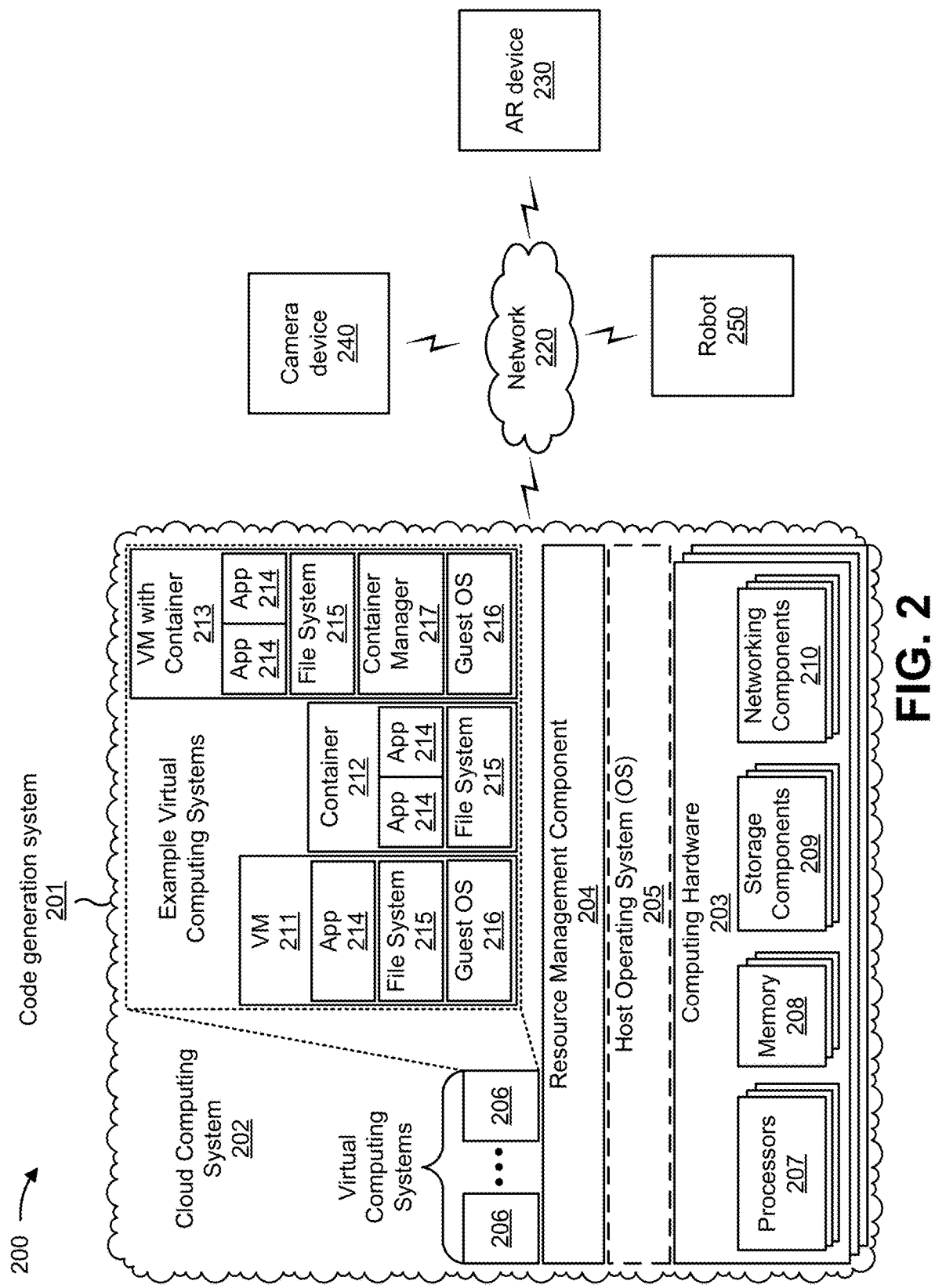
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a code generation system 201, which may include one or more elements of and/or may execute within a cloud computing system 202. The cloud computing system 202 may include one or more elements 203-213, as described in more detail below. As further shown in FIG. 2, environment 200 may include a network 220, an augmented reality device 230, a camera device 240, and/or a robot 250. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the code generation system 201 may include one or more elements 203-213 of the cloud computing system 202, may execute within the cloud computing system 202, and/or may be hosted within the cloud computing system 202, in some implementations, the code generation system 201 may not be cloud-based (e.g., may be implemented outside of a cloud computing system) or may be partially cloud-based. For example, the code generation system 201 may include one or more devices that are not part of the cloud computing system 202, such as device 300 of FIG. 3, which may include a standalone server or another type of computing device. The code generation system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Augmented reality device 230 includes one or more devices capable of receiving, generating, storing, processing, displaying, and/or providing information associated with video data corresponding to a field of view of a user, as described elsewhere herein. For example, augmented reality device 410 can be any suitable device having augmented reality and/or mixed reality capabilities (e.g., capabilities to render digital content in combination with real-world images), such as an optical see-through display device, a video see-through display device, a holographic display device, a heads-up display device, a smartphone, a tablet computer, a handheld computer, and/or the like. Augmented reality device 410 includes a camera that can capture video data, image data, and/or the like. For example, the camera can include a video camera, a still image camera, an infrared camera, and/or the like. Augmented reality device 410 further includes one or more display devices capable of rendering digital content in combination with the video data, the image data, and/or the like captured using the camera. For example, in some implementations, the one or more display devices can include a liquid crystal display (LCD) device, a light-emitting diode (LED) display device, a plasma display device, a wearable display device (e.g., a head-mounted display device), a handheld display device, a stereoscopic or three-dimensional display device, and/or the like.

Camera device 240 includes one or more devices capable of capturing an image and/or video and providing the captured image and/or video to another device, as described herein. For example, camera device 240 may include an image and/or video capturing device, a 360-degree camera, an infrared camera, and/or the like.

Robot 250 includes one or more devices capable of being programmed to perform an action automatically based on sensory input (e.g., an image, a sound, and/or the like). For example, robot 250 may include a robotic arm, an unmanned aerial vehicle, an autonomous vehicle, and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
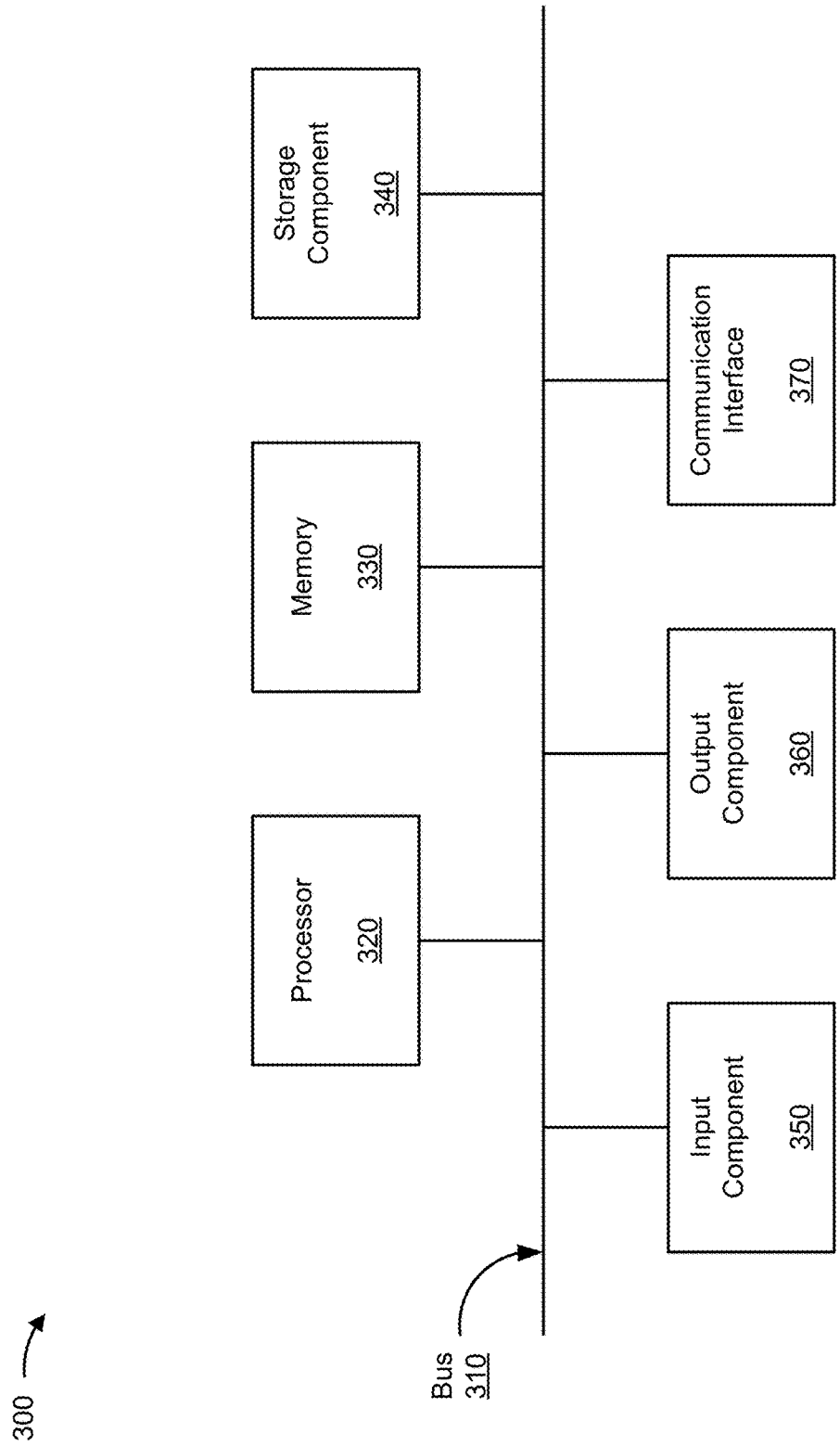
FIG. 3 is a diagram of example components of one or more devices of FIG. 2.

FIG. 3 is a diagram of example components of a device 300, which may correspond to the code generation system 201, the augmented reality device 230, the camera device 240, and/or the robot 250. In some implementations, the code generation system 201, the augmented reality device 230, the camera device 240, and/or the robot 250 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory), a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 associated with utilizing augmented reality and artificial intelligence to automatically generate code for a robot. In some implementations, one or more process blocks of FIG. 4 may be performed by a device (e.g., code generation system 201). In some implementations, one or more process blocks of FIG. 4 may be performed by another device or a group of devices separate from or including the device, such as an augmented reality device (e.g., augmented reality device 230), a camera device (e.g., camera device 240), a robot (e.g., robot 250), and/or the like. Additionally, or alternatively, one or more process blocks of FIG. 4 may be performed by one or more components of a device 300, such as processor 320, memory 330, storage component 340, input component 350, output component 360, communication component 370, and/or the like.

As shown in FIG. 4, process 400 may include receiving, from an augmented reality device, speech data identifying augmented reality interactions with an augmented reality robot (block 410). For example, the device may receive, from an augmented reality device, speech data identifying augmented reality interactions with an augmented reality robot, as described above.

As further shown in FIG. 4, process 400 may include receiving, from a camera, video data identifying movements of a real robot based on the augmented reality interactions with the augmented reality robot (block 420). For example, the device may receive, from a camera, video data identifying movements of a real robot based on the augmented reality interactions with the augmented reality robot, as described above.

As further shown in FIG. 4, process 400 may include processing, using a natural language processing model, the speech data to obtain first action data identifying first actions that the real robot is to perform (block 430). For example, the device may process, using a natural language processing model, the speech data to obtain first action data identifying first actions that the real robot is to perform, as described above.

As further shown in FIG. 4, process 400 may include processing, using a natural language video description model, the video data to obtain second action data identifying second actions that the real robot is to perform (block 440). For example, the device may process, using a natural language video description model, the video data to obtain second action data identifying second actions that the real robot is to perform, as described above.

As further shown in FIG. 4, process 400 may include processing the first action data and the second action data, with a pseudocode generation model, to generate pseudocode (block 450). For example, the device may process the first action data and the second action data, with a pseudocode generation model, to generate pseudocode, as described above.

As further shown in FIG. 4, process 400 may include transforming, using a code generator, the pseudocode into code (block 460). For example, the device may transform, using a code generator, the pseudocode into code, as described above.

As further shown in FIG. 4, process 400 may include causing the real robot to execute the code (block 470). For example, the device may cause the real robot to execute the code, as described above. In some implementations, executing the code causes the real robot to perform the first actions and the second actions.

As further shown in FIG. 4, process 400 may include receiving feedback data based on an adjustment to a movement of at least one of the augmented reality robot or the real robot during performance of one or more of the first actions or the second actions (block 480). For example, the device may receive feedback data based on an adjustment to a movement of at least one of the augmented reality robot or the real robot during performance of one or more of the first actions or the second actions, as described above.

As further shown in FIG. 4, process 400 may include performing one or more actions based on the feedback data (block 490). For example, the device may perform one or more actions based on the feedback data, as described above.

In a first implementation, processing the first action data and the second action data, with the pseudocode generation model, to generate the pseudocode comprises: parsing and normalizing first text of the first action data to generate first parsed and normalized text; parsing and normalizing second text of the second action data to generate second parsed and normalized text; generating a first tree based on pattern matching and concept mapping the first parsed and normalized text, and generating a second tree based on pattern matching and concept mapping the second parsed and normalized text.

In a second implementation, alone or in combination with the first implementation, processing the first action data and the second action data, with the pseudocode generation model, to generate the pseudocode comprises: traversing the first tree to determine a first portion of the pseudocode; traversing the second tree to determine a second portion of the pseudocode, and merging the first portion of the pseudocode and the second portion of the pseudocode into the pseudocode.

In a third implementation, alone or in combination with one or more of the first and second implementations, transforming the pseudocode into the code comprises: matching words of the pseudocode with actions, from a library that includes abstract generic predefined code for the real robot, to generate a set of matching words and actions; matching the words of the pseudocode with instructions executed by the real robot to generate a set of matching words and instructions, and generating the code based on the set of matching words and actions and the set of matching words and instructions.

In a fourth implementation, alone or in combination with one or more of the first through third implementations, performing the one or more actions comprises one or more of: updating the code based on the feedback data; validating the code based on the feedback data; or retraining the natural language processing model or the natural language video description model based on the feedback data.

In a fifth implementation, alone or in combination with one or more of the first through fourth implementations, performing the one or more actions comprises one or more of: validating the code based on the feedback data to generate validated code and providing the validated code to the real robot for execution; validating the code based on the feedback data to generate validated code and providing the validated code for sale in a marketplace for generated code; or validating the code based on the feedback data to generate validated code and implementing the validated code in a manufacturing environment.

In a sixth implementation, alone or in combination with one or more of the first through fifth implementations, performing the one or more actions comprises: modifying the code based on the feedback data to generate modified code; causing the real robot to execute the modified code; receiving, from the camera, feedback video data identifying modified movements of the real robot based on execution of the modified code, and validating the modified code based on the feedback video data.

In a seventh implementation, alone or in combination with one or more of the first through sixth implementations, the video data is received substantially concurrently with receipt of the speech data.

In an eighth implementation, alone or in combination with one or more of the first through seventh implementations, the real robot includes markers identifying components of the real robot and the video data identifies the movements of the real robot based on the markers.

In a ninth implementation, alone or in combination with one or more of the first through eighth implementations, the one or more actions includes receiving, from the augmented reality device, interactions with the augmented reality robot, while the real robot is executing the code, and modifying the code based on the interactions and the feedback video data.

In a tenth implementation, alone or in combination with one or more of the first through ninth implementations, the augmented reality device includes an augmented reality headset with a microphone and the real robot includes a robotic arm.

In an eleventh implementation, alone or in combination with one or more of the first through tenth implementations, the real robot includes one or more of a robotic arm, an unmanned aerial vehicle, or an autonomous vehicle.

In a twelfth implementation, alone or in combination with one or more of the first through eleventh implementations, the one or more actions include retraining the natural language processing model and the natural language video description model based on the feedback video data; modifying the code, with the retrained natural language processing model and the retrained natural language video description model, to generate modified code; causing the real robot to execute the modified code; receiving, from the camera, additional feedback video data identifying modified movements of the real robot based on execution of the modified code; and validating the modified code based on the additional feedback video data.

In a thirteenth implementation, alone or in combination with one or more of the first through twelfth implementations, process 400 includes parsing and normalizing first text of the first action data to generate first parsed and normalized text; parsing and normalizing second text of the second action data to generate second parsed and normalized text; generating a first tree based on pattern matching and concept mapping the first parsed and normalized text; generating a second tree based on pattern matching and concept mapping the second parsed and normalized text; traversing the first tree to determine a first portion of the pseudocode; traversing the second tree to determine a second portion of the pseudocode; and merging the first portion of the pseudocode and the second portion of the pseudocode into the pseudocode.

In a fourteenth implementation, alone or in combination with one or more of the first through thirteenth implementations, process 400 includes matching words of the pseudocode with actions, from a library that includes abstract generic predefined code for the real robot, to generate a set of matching words and actions; matching the words of the pseudocode with instructions executed by the real robot to generate a set of matching words and instructions; and generating the code based on the set of matching words and actions and the set of matching words and instructions.

In a fifteenth implementation, alone or in combination with one or more of the first through fourteenth implementations, process 400 includes one or more of updating the code based on the feedback video data; validating the code based on the feedback video data to generate validated code; providing the validated code to the real robot for execution; providing the validated code for sale in a marketplace for generated code; or implementing the validated code in a manufacturing environment.

In a sixteenth implementation, alone or in combination with one or more of the first through fifteenth implementations, process 400 includes modifying the code based on the feedback video data to generate modified code; causing the real robot to execute the modified code; receiving, from the camera, additional feedback video data identifying modified movements of the real robot based on execution of the modified code; and validating the modified code based on the additional feedback video data.

In a seventeenth implementation, alone or in combination with one or more of the first through sixteenth implementations, process 400 includes receiving, from the augmented reality device, interactions with the augmented reality robot, while the real robot is executing the code; and modifying the code based on the interactions and the feedback video data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from an augmented reality device, speech data identifying augmented reality interactions with an augmented reality robot;
   receiving, by the device and from a camera, video data identifying movements of a real robot based on the augmented reality interactions with the augmented reality robot;

processing, by the device and using a natural language processing model, the speech data to obtain first action data identifying first actions that the real robot is to perform;

processing, by the device and using a natural language video description model, the video data to obtain second action data identifying second actions that the real robot is to perform;

processing, by the device, the first action data and the second action data, with a pseudocode generation model, to generate pseudocode;

transforming, by the device and using a code generator, the pseudocode into code;

causing, by the device, the real robot to execute the code, wherein executing the code causes the real robot to perform the first actions and the second actions;

receiving, by the device, feedback data based on an adjustment to a movement of at least one of the augmented reality robot or the real robot during performance of one or more of the first actions or the second actions; and performing, by the device, one or more actions based on the feedback data.

2. The method of claim 1, wherein processing the first action data and the second action data, with the pseudocode generation model, to generate the pseudocode comprises:

parsing and normalizing first text of the first action data to generate first parsed and normalized text;

parsing and normalizing second text of the second action data to generate second parsed and normalized text;

generating a first tree based on pattern matching and concept mapping the first parsed and normalized text; and generating a second tree based on pattern matching and concept mapping the second parsed and normalized text.

3. The method of claim 2, wherein processing the first action data and the second action data, with the pseudocode generation model, to generate the pseudocode comprises:

traversing the first tree to determine a first portion of the pseudocode;

traversing the second tree to determine a second portion of the pseudocode; and merging the first portion of the pseudocode and the second portion of the pseudocode into the pseudocode.

4. The method of claim 1, wherein transforming the pseudocode into the code comprises:

matching words of the pseudocode with actions, from a library that includes abstract generic predefined code for the real robot, to generate a set of matching words and actions;

matching the words of the pseudocode with instructions executed by the real robot to generate a set of matching words and instructions; and generating the code based on the set of matching words and actions and the set of matching words and instructions.

5. The method of claim 1, wherein performing the one or more actions comprises one or more of:

updating the code based on the feedback data;

validating the code based on the feedback data; or retraining the natural language processing model or the natural language video description model based on the feedback data.

6. The method of claim 1, wherein performing the one or more actions comprises one or more of:

validating the code based on the feedback data to generate validated code and providing the validated code to the real robot for execution;

validating the code based on the feedback data to generate validated code and providing the validated code for sale in a marketplace for generated code; or validating the code based on the feedback data to generate validated code and implementing the validated code in a manufacturing environment.

7. The method of claim 1, wherein performing the one or more actions comprises:

modifying the code based on the feedback data to generate modified code;

causing the real robot to execute the modified code;

receiving, from the camera, feedback video data identifying modified movements of the real robot based on execution of the modified code; and validating the modified code based on the feedback video data.

8. A device, comprising:

one or more memories; and one or more processors, communicatively coupled to the one or more memories, configured to:

receive, from an augmented reality device, speech data identifying augmented reality interactions with an augmented reality robot;

receive, from a camera, video data identifying movements of a real robot based on the augmented reality interactions with the augmented reality robot;

process, with a natural language processing model, the speech data to obtain first action data identifying first actions that the real robot is to perform;

process, using a natural language video description model, the video data to obtain second action data identifying second actions that the real robot is to perform;

process the first action data and the second action data, with a pseudocode generation model, to generate pseudocode;

match words of the pseudocode with actions, from a library that includes abstract generic predefined code for the real robot, to generate a set of matching words and actions;

match the words of the pseudocode with instructions executed by the real robot to generate a set of matching words and instructions;

generate code based on the set of matching words and actions and the set of matching words and instructions;

cause the real robot to execute the code and perform the first actions and the second actions;

receive, from the camera, feedback video data identifying additional movements of the real robot based on execution of the code; and perform one or more actions based on the feedback video data.

9. The device of claim 8, wherein the video data is received substantially concurrently with receipt of the speech data.

10. The device of claim 8, wherein the real robot includes markers identifying components of the real robot and the video data identifies the movements of the real robot based on the markers.

11. The device of claim 8, wherein the one or more processors, when performing the one or more actions, are configured to:

receive, from the augmented reality device, interactions with the augmented reality robot, while the real robot is executing the code; and modify the code based on the interactions and the feedback video data.

12. The device of claim 8, wherein the augmented reality device includes an augmented reality headset with a microphone and the real robot includes a robotic arm.

13. The device of claim 8, wherein the real robot includes one or more of:
a robotic arm,
an unmanned aerial vehicle, or
an autonomous vehicle.

14. The device of claim 8, wherein the one or more processors, when performing the one or more actions, are configured to:
retrain the natural language processing model and the natural language video description model based on the feedback video data;
modify the code, with the retrained natural language processing model and the retrained natural language video description model, to generate modified code;
cause the real robot to execute the modified code;
receive, from the camera, additional feedback video data identifying modified movements of the real robot based on execution of the modified code; and
validate the modified code based on the additional feedback video data.

15. A non-transitory computer-readable medium storing instructions, the instructions comprising:
one or more instructions that, when executed by one or more processors, cause the one or more processors to:
receive, from an augmented reality device, speech data identifying augmented reality interactions with an augmented reality robot;
receive, from a camera, video data identifying movements of a real robot based on the augmented reality interactions with the augmented reality robot;
process, with a natural language processing model, the speech data to obtain first action data identifying first actions that the real robot is to perform;
process, using a natural language video description model, the video data to obtain second action data identifying second actions that the real robot is to perform;
process the first action data and the second action data, with a pseudocode generation model, to generate pseudocode;
transform the pseudocode into code;
cause the real robot to execute the code and perform the first actions and the second actions;
receive, from the camera, feedback video data identifying additional movements of the real robot based on execution of the code; and
retrain the natural language processing model or the natural language video description model based on the feedback video data.

16. The non-transitory computer-readable medium of claim 15, wherein the one or more instructions, that cause the one or more processors to process the first action data and the second action data, with the pseudocode generation model, to generate the pseudocode, cause the one or more processors to:
parse and normalize first text of the first action data to generate first parsed and normalized text;
parse and normalize second text of the second action data to generate second parsed and normalized text;
generate a first tree based on pattern matching and concept mapping the first parsed and normalized text;
generate a second tree based on pattern matching and concept mapping the second parsed and normalized text;
traverse the first tree to determine a first portion of the pseudocode;
traverse the second tree to determine a second portion of the pseudocode; and
merge the first portion of the pseudocode and the second portion of the pseudocode into the pseudocode.

17. The non-transitory computer-readable medium of claim 15, wherein the one or more instructions, that cause the one or more processors to transform the pseudocode into code, cause the one or more processors to:
match words of the pseudocode with actions, from a library that includes abstract generic predefined code for the real robot, to generate a set of matching words and actions;
match the words of the pseudocode with instructions executed by the real robot to generate a set of matching words and instructions; and
generate the code based on the set of matching words and actions and the set of matching words and instructions.

18. The non-transitory computer-readable medium of claim 15, wherein the instructions further comprise:
one or more instructions that, when executed by the one or more processors, cause the one or more processors to one or more of:
update the code based on the feedback video data;
validate the code based on the feedback video data to generate validated code;
provide the validated code to the real robot for execution;
provide the validated code for sale in a marketplace for generated code; or
implement the validated code in a manufacturing environment.

19. The non-transitory computer-readable medium of claim 15, wherein the instructions further comprise:
one or more instructions that, when executed by the one or more processors, cause the one or more processors to:
modify the code based on the feedback video data to generate modified code;
cause the real robot to execute the modified code;
receive, from the camera, additional feedback video data identifying modified movements of the real robot based on execution of the modified code; and
validate the modified code based on the additional feedback video data.

20. The non-transitory computer-readable medium of claim 15, wherein the instructions further comprise:
one or more instructions that, when executed by the one or more processors, cause the one or more processors to:
receive, from the augmented reality device, interactions with the augmented reality robot, while the real robot is executing the code; and
modify the code based on the interactions and the feedback video data.

* * * * *